US008139870B2

(12) United States Patent
Kato

(10) Patent No.: US 8,139,870 B2
(45) Date of Patent: Mar. 20, 2012

(54) IMAGE PROCESSING APPARATUS, RECORDING MEDIUM, COMPUTER DATA SIGNAL, AND IMAGE PROCESSING METHOD

(75) Inventor: Masahiro Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1073 days.

(21) Appl. No.: 11/511,994

(22) Filed: Aug. 29, 2006

(65) Prior Publication Data

US 2007/0206884 A1 Sep. 6, 2007

(30) Foreign Application Priority Data

Mar. 3, 2006 (JP) .................................. 2006-057544

(51) Int. Cl.
*G06K 9/54* (2006.01)
*G06K 9/18* (2006.01)
*G06K 9/72* (2006.01)

(52) U.S. Cl. ........ 382/229; 382/140; 382/182; 382/305; 382/321

(58) Field of Classification Search .................. 382/229, 382/140, 321
See application file for complete search history.

(56) References Cited

U.S. PATENT DOCUMENTS

| 4,524,453 | A | * | 6/1985 | Egami et al. ................... 382/101 |
| 5,025,396 | A | * | 6/1991 | Parks et al. .................... 715/210 |
| 5,787,414 | A | * | 7/1998 | Miike et al. ....................... 707/2 |
| 5,937,084 | A | * | 8/1999 | Crabtree et al. ............... 382/137 |
| 6,014,459 | A | * | 1/2000 | Taira et al. ..................... 382/176 |
| 6,886,136 | B1 | * | 4/2005 | Zlotnick et al. ............... 715/780 |

FOREIGN PATENT DOCUMENTS

| JP | HEI 5-061912 | 3/1993 |
| JP | HEI 6-274551 | 9/1994 |
| JP | 2002-342343 | 11/2002 |

* cited by examiner

*Primary Examiner* — Vu Le
*Assistant Examiner* — Michael Vanchy, Jr.
(74) *Attorney, Agent, or Firm* — Gesmer Updegrove LLP

(57) ABSTRACT

There is provided an image processing apparatus including a character recognition section that executes character recognition on an input document image and outputs a character recognition result, an item name extraction section that extracts a character string relevant to an item name of an information item from the character recognition result, an item value extraction section that extracts a character string of an item value corresponding to the item name from the vicinity of the character string relevant to the item name in the document image, and an extraction information creation section that creates extraction information by associating the character string of the item value extracted by the item value extraction section to the item name.

9 Claims, 10 Drawing Sheets

FIXED ASSET DISPOSAL APPLICATION FORM

APPLICANT

| DRAFTED DATE | M/D/Y | DRAFT NUMBER | |
|---|---|---|---|
| NAME OF FIXED ASSET | | | |
| FIXED ASSET NUMBER | | | |
| QUANTITY | | INSTALLATION LOCATION | |
| ACQUIRED DATE | M/Y | LIFE EXPANCY | YEARS |

Fig. 1

FIXED ASSET DISPOSAL APPLICATION FORM

APPLICANT JOHN SMITH

| DRAFTED DATE | 5/25/2004 | DRAFT NUMBER | 04024678 |
|---|---|---|---|
| NAME OF FIXED ASSET | | OmniPC5100 | |
| FIXED ASSET NUMBER | | 15045728 | |
| QUANTITY | 1 | INSTALLATION LOCATION | 5F, S-BLDG |
| ACQUIRED DATE | 6/1995 | LIFE EXPANCY | 10 YEARS |

Fig. 2

| EXTRACTION TARGET ITEM NAME | RELATIVE POSITION OF VALUE TO ITEM NAME |
|---|---|
| DRAFTED DATE | RIGHT |
| NAME OF FIXED ASSET | RIGHT |
| FIXED ASSET NUMBER | RIGHT |
| QUANTITY | RIGHT |
| ACQUIRED DATE | LOWER RIGHT |

Fig. 3

| ITEM NAME | VALUE |
|---|---|
| DRAFTED DATE | 5/25/2004 |
| NAME OF FIXED ASSET | OmniPC5100 |
| FIXED ASSET NUMBER | 15045728 |
| QUANTITY | 1 |
| ACQUIRED DATE | 6/1995 |

Fig. 5

| EXTRACTION TARGET ITEM NAME | CHARACTER STRING FEATURE OF ITEM VALUE |
|---|---|
| DRAFTED DATE | DATE |
| NAME OF FIXED ASSET | NUMBER |
| FIXED ASSET NUMBER | INTEGER OF 0 OR GREATER |
| QUANTITY | RIGHT |
| ACQUIRED DATE | DATE |

Fig. 6

| CATEGORY | FEATURE EXAMPLES | EXAMPLES |
|---|---|---|
| DATE | COMMONLY USED DATE NOTATIONS | 1/17/2006, JAN. 17, 2006 |
| TIME | COMMONLY USED TIME NOTATIONS | 0 AM, 3:00PM, 16:59 |
| PERSONAL NAME | WORDS KNOWN AS PERSONAL NAME | JOHN SMITH |
| PLACE NAME | WORDS KNOWN AS PLACE NAME | TOKYO-TO, SHINAGAWA-KU, NAKAI-MACHI |
| ORGANIZATION NAME | CHARACTER STRING COMBINED WITH SPECIFIC CHARACTER STRING, e.g. "XX CO, LTD.", "XX DEPT.", "XX SEC.", "XX GROUP", "XX OFFICE", "XX SOCIETY" | FUJI XEROX CO, LTD., TOKYO METROPOLITAN GOVERNMENT BOARD OF EDUCATION |
| PRICE | NUMERIC CHARACTER STRING COMBINED WITH SPECIFIC CHARACTER STRING, e.g. "¥", "$" | ¥1,000, $100 |
| NUMERICAL VALUE | NUMERIC CHARACTER STRING | 123456 |
| NUMBER | CHARACTER STRING COMPOSED OF ALPHANUMERIC CHARACTER AND SPECIFIC SYMBOL | FE05-05359 |

Fig. 7

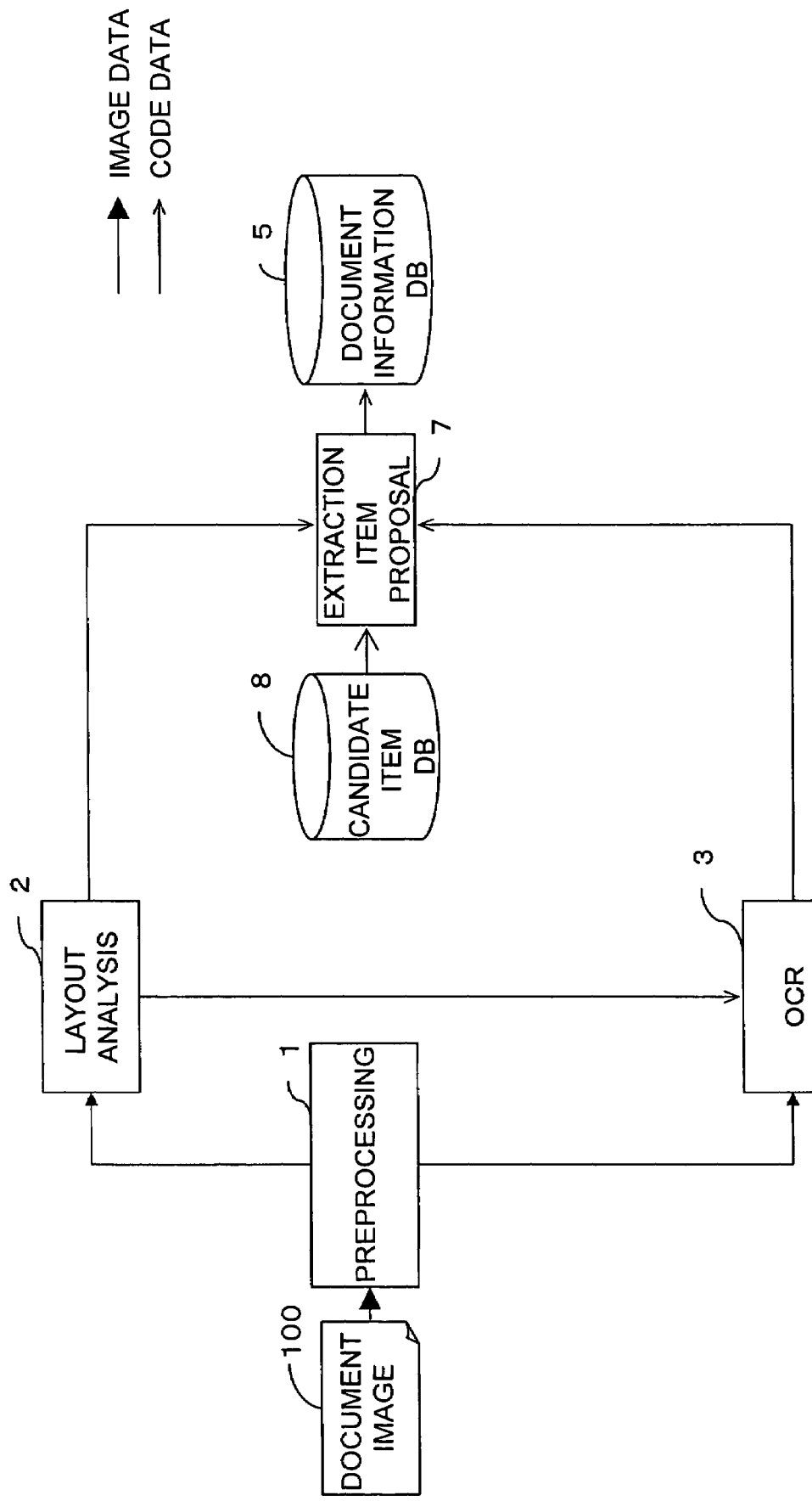

EXTRACTION ITEM EDIT

SELECT EXTRACTION TARGET ITEM AND EDIT ITEM NAME

| | CANDIDATE ITEM NAME | CANDIDATE ITEM VALUE |
|---|---|---|
| ☑ | DATE OF DRAFTING | 5/25/2004 |
| ☐ | DRAFT NUMBER | 04024678 |
| ☑ | NAME OF FIXED ASSET | OmniPC5100 |
| ☑ | FIXED ASSET NUMBER | 15045728 |
| ☑ | QUANTITY FOR DISPOSAL | 1 |
| ⋮ | ⋮ | ⋮ |

90 (points to checkbox column)

92 (points to OK button)

Fig. 9

IMAGE PROCESSING APPARATUS, RECORDING MEDIUM, COMPUTER DATA SIGNAL, AND IMAGE PROCESSING METHOD

BACKGROUND

1. Technical Field

The present invention relates to a technique of extracting information contained in a document by performing a character recognition process on an image of the document.

2. Related Art

Electronic filing in which a paper document is scanned and the scanned document image is stored as an electronic document file is widely used. In such electronic document filing, it is common for optical character recognition (OCR) to be performed on an image obtained by scanning and to integrate the results of the character recognition processing into the electronic document file to increase retrievability. If a source material is a fixed format document such as a form, the location on the document image of each item of information on the document, such as an address or charge on a debit note, which are also called "attributes", is often known. Utilizing this knowledge, it is also common to read a character string on a specific position on the scanned document image and integrate the character string into the electronic file as a value of a specific information item. When this is done, the location (or range) of the value of each information item on the document is measured and the information is stored in an electronic filing device. The electronic filing device can thereby retrieve a desired character string from a specific location predetermined for each information item on the document image.

In electronic filing of a document in which locations of information items are unknown, a further technique for increasing retrievability is used, in which a keyword from the result of character recognition is extracted and the extracted keyword is integrated into the electronic document file.

SUMMARY

According to one aspect of the invention, there is provided an image processing apparatus including a character recognition section that executes character recognition on an input document image and outputs a character recognition result, an item name extraction section that extracts a character string relevant to an item name of an information item from the character recognition result, an item value extraction section that extracts a character string of an item value corresponding to the item name from the vicinity of the character string relevant to the item name in the document image, and an extraction information creation section that creates extraction information by associating the character string of the item value extracted by the item value extraction section to the item name.

BRIEF DESCRIPTION OF THE DRAWINGS

Exemplary embodiments of the present invention will be described in detail based on the following figures, wherein:

FIG. 1 illustrates an example of a form of a document;

FIG. 2 illustrates an example of a specific document in which specific values are input to the form of FIG. 1;

FIG. 3 illustrates an example of extraction item information that is created corresponding to the form of FIG. 1;

FIG. 5 illustrates information items that are extracted from the document of FIG. 2 using the extraction item information of FIG. 3;

FIG. 6 illustrates an example of extraction item information that is used in an alternative exemplary embodiment;

FIG. 7 illustrates examples of character string features for each category of information items;

FIG. 8 illustrates an exemplary configuration for extraction item proposal in an electronic filing device;

FIG. 9 illustrates an example of an extraction item edit display; and

DETAILED DESCRIPTION

Figure 4:
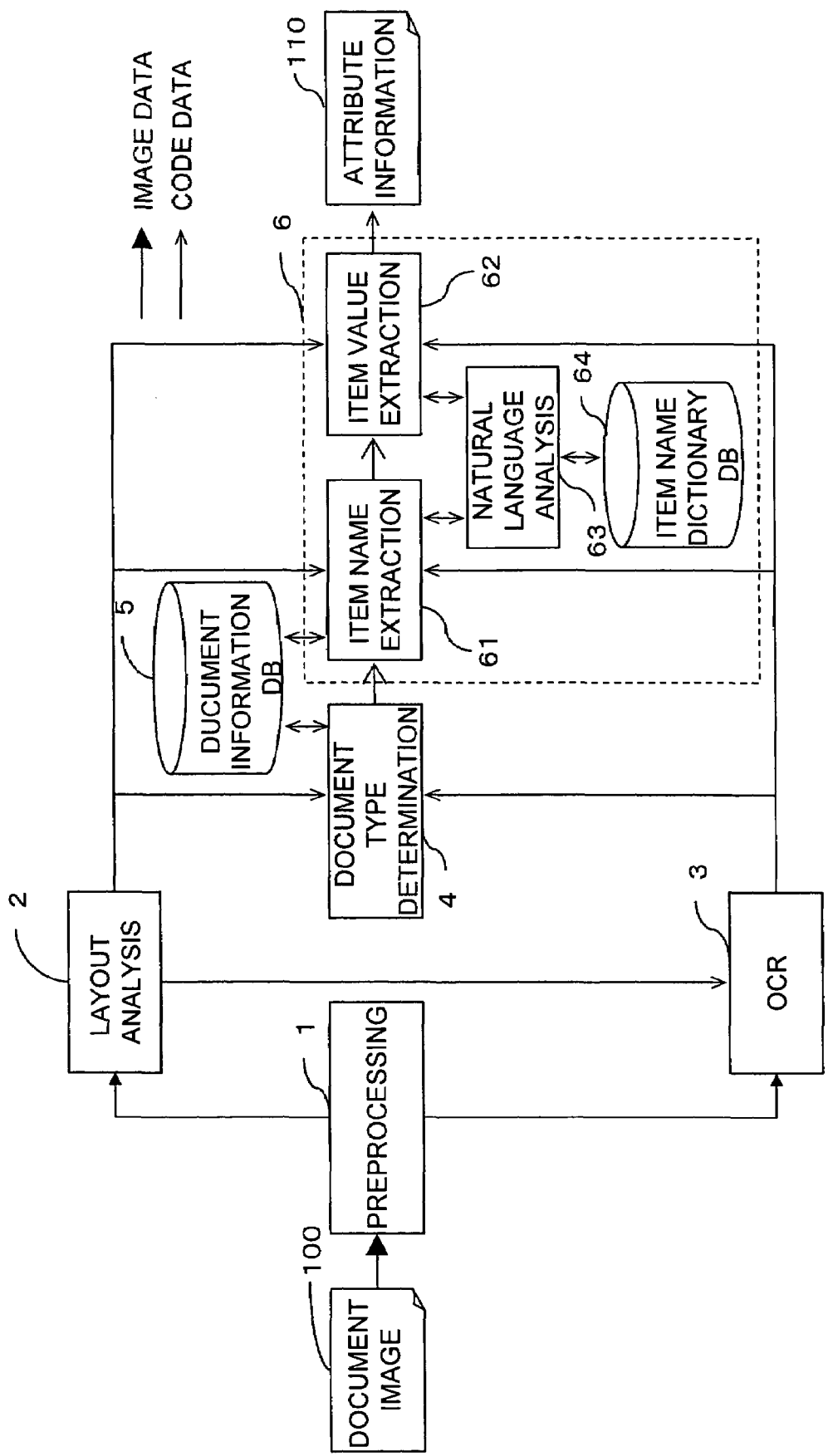
FIG. 4 is a functional block diagram of an electronic filing device according to an exemplary embodiment.
Figure 10:
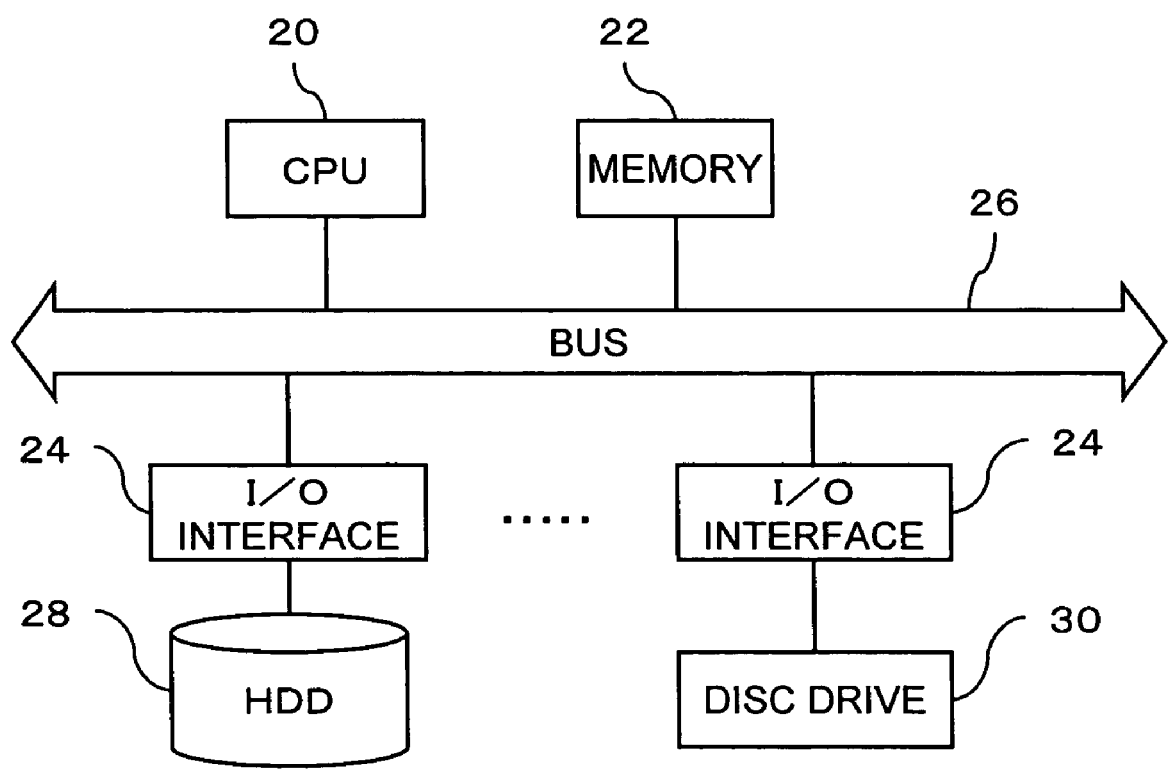
FIG. 10 illustrates an example of a hardware configuration of a general-purpose computer that is capable of implementing an electronic filing device.

Exemplary embodiments of the present invention are described hereinafter with reference to the drawings.

Forms of business documents such as debit notes and estimates vary among companies and even among departments within a single company. However, these documents are created for people to read and understand and an item "product name" would therefore be accompanied by an actual name of a product and an item "price" would be accompanied by an actual price.

When an item name and item value of an information item (referred to also as an attribute item) are described in pairs in a document, people usually place a value of a corresponding item in a position that is close to and has a specific positional relationship with the item name. For example, in a European language text and a Japanese text using horizontal writing, an item value is typically located to the right of, below, or to the lower right of a corresponding item name. In conjunction with vertically-written Japanese text, an item value is typically written below, to the left of, or to the lower left of an item. In this manner, when creating a document for other people to understand, an item name and an item value of an information item are usually placed close to each other with a positional relationship that may be determined to some extent according to language or notation.

Therefore, in the present exemplary embodiment, an information item is extracted from a document image by finding an item name of an item to be extracted from the document image and then searching the vicinity of the item name to find a value of the item.

In an example in which a department of a company creates a "Fixed Asset Disposal Application Form" as shown in FIG. 1, the application form contains the information items (attribute items) "drafted date", "draft number", name of a fixed asset to be disposed ("name of fixed asset"), identification number ("fixed asset number"), "quantity", "installation location", "acquired date", and "life expectancy". For the items of "drafted date", "draft number", "name of fixed asset", "fixed asset number", "quantity", and "installation location", a field (cell) to enter a value of each item is placed on the right side of the field of each item name. For example, to the right of the item name "drafted date", there is a field in which a specific date when the application form is actually filled out or completed can be entered. For the items of "acquired date" and "life expectancy", an area to enter a value of each item is placed within the same field as the item name, in the lower right of the item name. FIG. 2 illustrates an example wherein a specific value of each item is entered in the form as shown in FIG. 1.

To automatically extract an information item from a document that is created by filling in the "fixed asset disposal application form" as shown in FIG. 1, the exemplary embodiment prepares extraction item information as shown in FIG. 3. In the example of FIG. 3, targets of extraction are "name of fixed asset", "fixed asset number", "quantity", and "acquired date". It is not necessary that all information items contained in the form be extracted, and only necessary to extract items necessary for a desired purpose. The extraction item information contains, for each extraction target information item, information concerning the relative position of an item value to a corresponding item name. For example, the extraction item information illustrated in FIG. 3 indicates that a value of an item indicated by the item name "drafted date" is located closely to the "right" of the item name, and that a value of an item indicated by the item name "acquired date" is located closely to the "lower right" of the item name.

The electronic filing device of this exemplary embodiment stores such extraction item information. Upon input of the document image of the "fixed asset disposal application form", the electronic filing device performs a known optical character recognition process on the document image and retrieves extraction target item names from the character recognition results. The electronic filing device then retrieves the relative position of the value corresponding to each retrieved item name from the extraction item information, and extracts, from the character recognition results, a character string located at an appropriate relative position to the item name as the value for the item.

An outline of the present exemplary embodiment is described in the foregoing. Referring now to FIG. 4, an exemplary configuration of the electronic filing device of this exemplary embodiment is described hereinafter.

The electronic filing device converts an input document image 100 into a file in a storage file format preset to the device, such as the Portable Document File (PDF) format, and stores the file in a prescribed database or the like. The electronic filing device then extracts information items from the document image 100 and integrates the extracted information items with the storage file as attribute information 110 of the document image 100.

The input document image 100 may be image data obtained by scanning a paper document using a scanner (not shown). The electronic filing device may be realized by executing a program that describes the functions of the following function modules 1 to 6 on a general-purpose computer that is connected to the scanner. Alternatively, the functions of the electronic filing device may be integrated into a digital copying machine or a multifunction device that includes a scanner. In such a case, a program that describes the functions of the function modules 1 to 6 may be executed on a computer that is included in the digital copying machine or the multifunction device. A module for image processing in the function modules 1 to 6 may be composed of a hardware circuit or a digital signal processor (DSP). Further, a document image 100 that is created by application software may be input to the electronic filing device instead of or in addition to the scanned document image 100. Each function module of the electronic filing device illustrated in FIG. 4 is described hereinbelow.

A preprocessing section 1 performs preprocessing that is necessary for OCR, such as binarization of an image, correction of tilt and removal of noise. The preprocessed image output from the preprocessing section 1 is supplied to a layout analysis section 2 and an OCR section 3.

The layout analysis section 2 performs well-known layout analysis on the preprocessed image to thereby extract areas such as a text area, a continuous tone image area and a table area from the image. Each of the extracted text area contains a character string. The character string in the text area may be split into plural character strings each representing a word or a phrase. The layout analysis can locate the position (or existence range) of each text area on the document image 100. Information indicating a text area in the preprocessed image obtained as a result of the layout analysis is supplied to the OCR section 3.

The OCR section 3 performs OCR on the image of the text area in the preprocessed image to thereby obtain text information from the text area. As is well known, the OCR processing recognizes each character contained in the text area. It is also possible to locate the position of each character in the document image 100. The description on the OCR processing is not detailed herein because it may be performed using well-known techniques.

A document type determination section 4 determines the document type of the input document image 100 based on the result of layout analysis in the layout analysis section 2 and the result of character recognition in the OCR section 3. The document type identifies a class or category of documents from which information is extracted, and may be, for example, debit note, estimate, purchase application form, fixed asset disposal application form, or any other type of form or document. The electronic filing device of the exemplary embodiment extracts information items as required for each type of document among the plural document types.

As basic information for the determination of a document type, a document information database (DB) 5 stores feature information for each document type. The feature information of a document type is information regarding the features of a document type, such as a distinct character string that would be commonly contained in a type of document, a common layout feature of a type of document, and so on. The distinct character strings of a document type may be a document name such as "debit note", a character string in a heading that appears in a document, such as "brief summary", and so on. The layout feature of a document type may be the shape or size of areas such as a text area and a continuous tone image area contained in a document, the positional relationship between those areas, and so on. The information that a specific character string (e.g. document name), a specific image (e.g. company logo) and so on are located in a specific position of a document is also one layout feature. The document type determination section 4 refers to the feature information of each document type that is stored in the document information DB 5 to specify the document type that matches most closely the result of layout analysis and the result of character recognition. As determination of a document type is also a well-known technique, further description is not provided herein.

The document information database DB 5 also stores extraction item information (cf. FIG. 3) for each document type. Because an information item to be extracted differs according to document type, such as "debit note" or "estimate", individual extraction item information is prepared for each document type.

An information item extraction section 6 retrieves extraction item information for the document type that is indicated by the determination result of the document type determination section 4 and extracts information items of extraction target that are indicated by the extraction item information from the result of character recognition in the OCR section 3. The information item extraction section 6 includes an item name extraction section 61, an item value extraction section 62, a natural language analysis section 63, and an item name dictionary DB 64.

The item name extraction section 61 extracts from the results of character recognition character strings relevant to each item name of an extraction target as contained in the extraction item information. Because the target document (document image 100) is created by a human user, the item names that are contained in the document do not necessarily match the item names stored in the extraction item information. For example, an item stored as "drafted date" in the extraction item information may appear in an actual document as a different item name such as "drafted year, month and day" or "date of drafting". Therefore, the item name extraction section 61 makes use of the natural language analysis section 63 to consider word variations and find the item name of an extraction target from the character recognition results. This process is described below.

The item name extraction section 61 supplies the character recognition results to the natural language analysis section 63 along with item names of extraction target contained in the extraction item information, which may be supplied sequentially one by one. The natural language analysis section 63 has known language analyses functions such as morphological analysis, syntactic analysis, and semantic analysis. Using those functions, the natural language analysis section 63 analyzes a character string in each text area and finds the one that matches most closely the item name of an extraction target from the character strings. If one text area contains plural words, those words are recognized by the natural language analysis, and a character string in the text area is recognized as a collection of plural words.

During this analysis, the natural language analysis section 63 refers to the item name dictionary DB 64. The item name dictionary DB 64 stores information of synonyms and quasi-synonyms of the words that are likely to be contained in the item name of an extraction target, such as, for example, information that "year and month", "year, month and day" and "date" are quasi-synonyms. The item name dictionary DB 64 may also store a numerical value indicating a similarity of quasi-synonyms.

If the natural language analysis section 63 finds a character string that completely matches the item name received from the item name extraction section 61, it can determine the character string to be an item name of an extraction target. If the natural language analysis section 63 does not find the one that completely matches, it can replace each word that composes the item name with a synonym to form a variation of an item name and search for a character string that matches the variation from the character recognition results. If the natural language analysis section 63 finds a character string that completely matches the variation, it can determine the character string to be an item name of an extraction target. It is possible that plural character strings may match plural different variations might be found from the character recognition results. In such a case, the string with highest similarity to the item name of an extraction target (which can be calculated from the similarity of words composing an item name and words composing the variation) may be selected from among the variations found from the character recognition results. It is also possible that an item name might appear as a different character string due to declension or change in the part of speech of a word composing an item name. In such a case, the natural language analysis section 63 may perform morphological analysis, syntactic analysis, and semantic analysis on each character string in the character recognition results and extract a character string with high semantic similarity to an item name of an extraction target.

The item name extraction section 61 supplies the item name that is extracted from the character recognition results and the information of the position (or existence range) of the character string that is relevant to the item name in the document image 100 to the item value extraction section 62. If it is determined that the whole character string in one text area is relevant to one item name, as is often the case with a form such as that illustrated in FIG. 2, the information of the position of the text area that is contained in the result of layout analysis immediately indicates the position of the character string itself. On the other hand, if a character string in a part of a text area is relevant to one item name, it is possible to determine the position of the character string from the position of the text area and the positions of the head and end of the character string in the text area.

The item value extraction section 62 retrieves the information of a relative position of an item value corresponding to the received item name from the extraction item information and extracts a character string that is in close proximity to the relative position to the character string of the extracted item name as an item value from the character recognition results. For example, when extracting the value "acquired date" from the document image as shown in FIG. 2, the extraction item information (FIG. 3) indicates that the value "acquired date" is at the "lower right" of the item name. Thus, the item value extraction section 62 extracts as the item value the character string (i.e. 6/1995) in the text area closest to the lower right of the character string extracted as an item name by the item name extraction section 61 from among the character strings obtained by character recognition.

A character string that is distant from the item name "acquired date" is less likely to contain the value "acquired date", even when it is at the "lower right" of the item name. It is therefore necessary to determine whether or not the character string is in "close proximity" to the item name. If a field of an item name and a field of an item value are divided by a ruled line, it can be determined that the character strings in those fields would be in close proximity to each other when the field of the item name and the field of the item value are in close proximity to each other, as "drafted date" and "name of fixed asset" in the example of FIG. 1. On the other hand, if an item name and an item value are not divided by a ruled line such as "acquired date", a character string within a given threshold distance from the area of the item name may be determined to be a character string in "close proximity", for example. The threshold distance may be variable according to the character size of the item name so that the range of "close proximity" is made wider when the character of an item name is larger.

The information item extraction section 6 uses the above functional modules 61 to 64 to extract a value of each information item of an extraction target from the character recognition results in accordance with the document type of the document image 100. The extracted item value is integrated into the attribute information 110 in association with the item name. FIG. 5 illustrates an example of the attribute information 110 that is extracted according to the extraction item information of FIG. 3 from the document image of FIG. 2. The attribute information 110 is added as attribute or meta information to the document image file in PDF format that is created separately in the electronic filing device. The electronic filing device stores the created file in a prescribed storage location.

One exemplary embodiment of the present invention is described above. This exemplary embodiment designates the position of an item value to be extracted from a document image with a relative position to an item name, and thus is more tolerant to scaling up and down of a document image compared with a conventional technique that designates the position of each item value with an absolute position in a document image. Further, this exemplary embodiment does not set an absolute position of each information item value. Therefore, when there exist plural document forms that are the same in type but different in the positions of information items, the electronic filing device can deal with the different forms with one extraction item information.

If only one relative position of an item value is set for an item name, it is impossible to deal with a document in which an item value is located in different positions. This concern, however, can be addressed by setting plural relative positions such as "right", "lower right", and "underneath" for one item name.

In the above exemplary embodiment, the document type determination section 4 determines a document type based on the results of layout analysis and character recognition. Alternatively, it is possible to present a list of document types to a user and prompt the user for selection of a document type of the document image 100.

In the above exemplary embodiment, a relative position of an item value to an item name is predetermined. An alternative exemplary embodiment that eliminates the need for determining such a relative position is described hereinafter.

The alternative exemplary embodiment stores a feature of a character string of an item value rather than a relative position of an item value for an item name of an extraction target information item. FIG. 6 illustrates an example of extraction item information that is used in the alternative exemplary embodiment. In this example, an item value of an extraction target information item "acquired date" has a feature that is relevant to "date", and "fixed asset number" has a feature relevant to "number". The "date" and "number" are categories that indicate a type of an extraction target information item. FIG. 7 illustrates examples of character string features of each category.

In the example of FIG. 7, the category "date" includes all notations that are generally used to represent date. Specifically, the category may include various notation styles such as "1/27/06" or "Jan. 27, 2006". The category "personal name" is an arrangement of a string that is generally known as a surname and a string that is generally known as a given name in a prescribed order, which depends on language. The category "organization name" is a name of an organization such as a company or a department. Specifically, it may be a character string that includes a specific word such as "Co, Ltd." or "dept." that indicates a certain unit of an organization. The character string "Fuji Xerox Co, Ltd." is an example of the organization name. The category "price" is a character string that is composed of a specific character or character string indicating a price such as "¥" or "$" and numerical values. The category "number" is defined as a character string composed of alphanumeric characters and a specific symbol such as a hyphen. There are a variety of programs and algorithms for detecting character strings that are relevant to the feature examples shown in FIG. 7. The use of such programs and algorithms enable the extraction of a character string having the feature of each extraction target information item from the character recognition results.

The functional configuration of the electronic filing device of the alternative exemplary embodiment may be the same as the configuration illustrated in FIG. 4. The difference is that the extraction item information stored in the document information DB 5 is one as shown in FIG. 6, the category information as shown in FIG. 7 is stored in the document information DB 5, and the processing to extract an item value performed by the item value extraction section 62 is different from the above exemplary embodiment. The other functional modules may be the same as those in the above exemplary embedment.

In the alternative exemplary embodiment, the item value extraction section 62 retrieves character strings within each text area in the vicinity of the character string that is relevant to an extraction target item name retrieved by the item name extraction section 61 from the character recognition results by the OCR section 3. From those character strings, the item value extraction section 62 extracts the character string having a character string feature that corresponds to the item name as an item value that corresponds to the item name. If a text area in close proximity to the item name is large, the character string in a part of the area may be extracted as an item value. If there are plural text areas that are in close proximity to the item name, it is possible to calculate a numerical value indicating the closeness of matching of the character strings included in each text area to the feature of the extraction target item value and to select the character string that most closely matches as an item value. The technique for selecting a character string based on the closeness of matching to a feature is well known and thus not described in further detail herein. The value of each item that is extracted in this manner is integrated into the attribute information 110.

The character string can be in close proximity to an extraction target item name in various directions such as above, below, left, right, upper right, lower right, upper left and lower left. An item value for an item name will have a greater likelihood of appearing in certain positions depending on the language or notation system used for the description of a document. Therefore, in the direction where the item value is likely to appear in the language or notation style in use, it is possible to search for a character string having the feature of an item value from the adjacent character strings farther than in a random direction. For example, in a European language text and a Japanese text using horizontal writing, an item value is likely to appear to the right, below, or to the lower right of an item name. It is thus possible to select a character string at such a position having an appropriate feature as an item value from among the character strings located in close proximity to the character string indicating the item name. It is also possible to prioritize positions (e.g. right of, below, and to the lower right) in the vicinity of an item name, search for the character string having an appropriate feature for the item name sequentially from the position with highest priority, and stop the searching upon finding of the character string having the appropriate feature.

According to the alternative exemplary embodiment, the electronic filing device may automatically search for a character string having an appropriate feature of an item value from the vicinity of an item name without the need for presetting the position of an item value relative to the item name. When a relative position of an item value to an item name is predesignated, it is not possible to deal with a form in which an item value is located in a position other than the preset relative position. This problem does not substantially occur in this alternative exemplary embodiment. The alternative exemplary embodiment may thus better deal with documents of varied layouts than the above exemplary embodiment.

In the above exemplary embodiment and alternative exemplary embodiment, extraction item information as shown in FIGS. 3 and 6 are prepared in advance. A system configuration for supporting preparation of the extraction item information is described hereinafter with reference to FIG. 8. In FIG. 8, the modules having the same or similar functions as the functional modules shown in FIG. 4 are denoted by the same reference numerals and not detailed below.

FIG. 8 illustrates only the functional modules that are related to the functions for supporting creation of extraction item information. The functional modules may be included in the electronic filing device of the above-described exemplary embodiment or alternative exemplary embodiment. In such a case, the preprocessing section 1, the layout analysis section 2 and the OCR section 3 may also serve as those in the electronic filing device. Alternatively, the electronic filing device may implement the functions for supporting creation of extraction item information as a different device.

In the device of FIG. 8, a candidate item DB 8 stores feature information of an item value as a candidate for an extraction target item. The feature information stored in the candidate item DB 8 may be similar to the category information illustrated in FIG. 7. In the automatic extraction of information from a formulaic document (in which, however, the layout is not strictly fixed), there are items that are likely to be an extraction target in common without depending on the type of a document, such as date, numerical value, number, and personal name. The list of features of item values that are likely to be extraction targets may be similar to the category information as illustrated in FIG. 7. The name of the categories (e.g. "date" and "personal name") that correspond to the features of an item value may be used as information to find a character string indicating an item name from the vicinity of an item value.

Upon input of the document image 100 to the device of FIG. 8, the preprocessing section 1 performs preprocessing on the document image 100, and the layout analysis section 2 and the OCR section 3 perform layout analysis and character recognition, respectively, on the preprocessed image. An extraction item proposal section 7 receives the result of layout analysis from the layout analysis section 2 and the character recognition results from the OCR section 3, retrieves information about a candidate extraction target item by referring to the, candidate item DB 8, and presents the retrieved information to the user.

Specifically, the extraction item proposal section 7 retrieves a character string having the feature that is stored in the candidate item DB 8 from the character recognition results. The retrieved character string is relevant to an item value. After retrieving the character string indicating the item value, the extraction item proposal section 7 further retrieves a character string that is relevant to an item name from the character strings located in close proximity to the retrieved character string. This processing retrieves a category name that corresponds to the character string feature from the candidate item DB 8 and searches for a character string that contains the category name or its quasi-synonym from the vicinity of the character string indicating the item value. For example, if a character string that is relevant to a value of date such as "5/25/2004" is found, a character string that contains a word or phrase similar to the date is searched for in the vicinity of the character string. Consequently, for example, if a character string containing the word "date" belonging to a semantic category of data is found, such as, for example, "date of drafting" or the like, that character string is recognized as a candidate for an item name.

Because an item name is likely to appear to the left, above, or to the upper left of an item value in a European or Japanese language text using horizontal writing, the search range may be limited to those parts. Subsequently, a display for editing an extraction item that contains a list of all candidates for item values and item names that are retrieved from the document image 100 is presented to allow a user to select of an extraction target item on the display.

FIG. 9 illustrates an example of a display for editing an extraction item that is presented to a user. This display contains a list of pairs of candidates for item names and candidates for item values that are extracted from the document image 100. Accompanying each displayed pair is a check box 90 which a user can use to select, separately for each pair, whether or not that set of items should be designated as an extraction target. Naturally, the check boxes 90 may be replaced with another user input tool, such as a radio button which allows designation of whether or not a pair of items is to be selected as an extraction target. For example, a user may select "drafted date" as an extraction target by marking the check box 90 at the side of "date of drafting" in the first row of the list of FIG. 9. Further, the field of a candidate item name may contain not just a word or phrase in the semantic category of a category name, but also character strings in the vicinity thereof so that a user may edit the character string in the field if desired to create an item name of an extraction target. For example, a user may edit the character string "date of drafting" displayed in the field to create an item name "drafted date". After a user selects an appropriate item, completes editing the item name, and clicks an OK button 92, the information of selected items and corresponding item names are stored in the document information DB 5 as extraction item information. A relative position of a candidate item value to each candidate item name may be included in extraction item information. Alternatively, a category name of a category to which each candidate item value belongs may be included in extraction item information.

A character string that indicates a document name or heading may be extracted from the document image 100 that contains extraction item information using a conventional technique, may be stored in the document information DB 5 as feature information indicating the type of document to which the extraction item information is applied. The information of a positional relationship of each area acquired from the document image 100 by the layout analysis section 2 may be stored in the document information DB 5 as feature information corresponding to the type of the document.

After the extraction item information is created and stored in the document information DB 5, the electronic filing device may automatically extract required information items from an image of the same type of document using the created information.

The above-described electronic filing device may be realized by executing a program that describes the functions or processing of the above functional modules on a general-purpose computer. The computer may have a circuit configuration as hardware in which a central processing unit (CPU) 20, a memory (primary storage) 22, various input/output (I/O) interfaces 24 and so on are connected through a bus 26. To the bus 26, a hard disc drive (HDD) 28 and a disc drive 30 for reading a portable nonvolatile recording medium of various standards such as CD, DVD and flash memory may be connected through the I/O interface 24. With such a configuration, the drives 28 and 30 serve as external storage devices for the memory. The program that describes the processing of the functional modules of the exemplary embodiment or alternative exemplary embodiment is then stored in a fixed storage such as the hard disc drive 28 through a recording medium such as CD and DVD or via network and installed to the computer. The program stored in the fixed storage is then loaded to a memory and executed by the CPU, thereby realizing the processing of the exemplary embodiment or the alternative exemplary embodiment. Alternatively, the functions of the electronic filing device may be integrated to a device such as a digital copying machine or a digital multifunction printer. In such a case, a program that describes the functions or processing of the above functional modules may be executed on a processor in the device, thereby realizing the functions of the electronic filing device. A subset of the functional modules in the electronic filing device may be implemented as a hardware circuit such as an integrated circuit or a discrete circuit, or a DSP.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
    an optical character recognition section that generates a document image by optically reading a paper document, executes optical character recognition on the document image, and outputs a character recognition result;
    an item name extraction section that obtains a character string semantically corresponding to an item name of an extraction target by natural language analysis and extracts, from the character recognition result, a first character string as a character string relevant to the item name of the extraction target;
    an extraction item storage section that stores extraction item information containing an item name of an information item and a relative position of an item value corresponding to the item name within a document image;
    an item value extraction section, operatively connected to said item name extraction section and said extraction item storage section, that retrieves information of a relative position of a second character string from said extraction item storage section, the relative position of the second character string being a location in the document image in the vicinity of the extracted first character string corresponding to the item name in one or more of left, right, upper, lower, lower left, lower right, upper left, and upper right directions from the extracted first character string, and extracts the second character string of an item value corresponding to the item name based upon the retrieved relative position of the second character string, the second character string being different from the first character string; and
    an extraction information creation section that creates extraction information by associating the second character string of the item value extracted by the item value extraction section to the item name.

2. The image processing apparatus according to claim 1, wherein the extraction item storage section is capable of storing a plurality of relative positions for an item value and stores a character string feature indicating a feature of a character string of a value of an item name in association with an item name of an information item of an extraction target, and
    when character strings are extracted respectively from the plurality of relative positions corresponding to the item name, the item value extraction section extracts the second character string having a character string feature corresponding to the item name from the extracted character strings.

3. The image processing apparatus according to claim 1, further comprising:
    a document type determination section that determines a document type of an input document image based on at least one of a result of character recognition and a result of layout analysis on the document image; and
    an extraction item storage section that stores extraction item information containing an item name of an information item of an extraction target for each document type of a document image,
    wherein the item name extraction section extracts the first character string relevant to an item name contained in the extraction item information corresponding to the document type determined by the document type determination section.

4. An image processing apparatus comprising:
    a character recognition section that executes character recognition on an input document image and outputs a character recognition result;
    an item name extraction section that extracts a first character string relevant to an item name of an information item from the character recognition result;
    an extraction item storage section that stores extraction item information containing an item name of an information item and a relative position of an item value corresponding to the item name within a document image;
    an item value extraction section, operatively connected to said item name extraction section and said extraction item storage section, that retrieves information of a relative position of a second character string from said extraction item storage section, the relative position of the second character string being a location in the document image with respect to the extracted first character string corresponding to the item name, and extracts the second character string of an item value corresponding to the item name based upon the retrieved relative position of the second character string, the second character string being different from the first character string;
    an extraction information creation section that creates extraction information by associating the second character string of the item value extracted by the item value extraction section to the item name;
    an extraction item storage section that stores extraction item information containing an item name of an information item of an extraction target;
    a candidate information storage section that stores a character string feature indicating a feature of a character string for an item value of an information item as a candidate for extraction from a document image; and
    an extraction item proposal section that searches for a character string having a feature indicated by a character string feature stored in the candidate information storage section from the result of character recognition on the input document image, upon retrieval of the character string having the character string feature by the searching; presents to a user the retrieved character string and a character string located in the vicinity of the character string in the document image as candidates for an item value and an item name; receives from the user an indication as to whether or not to select the candidates for an item value and an item name as an extraction target; and, upon receipt of an indication to select the candidates as an extraction target, stores the item name in the extraction item storage section.

5. The image processing apparatus according to claim 4, wherein the extraction item proposal section provides a user interface to edit a candidate for the item name and stores the item name edited by the user interface in the extraction item storage section.

6. The image processing apparatus according to claim 4, wherein when storing an item name in the extraction item storage section, the extraction item proposal section stores a relative position of a candidate for the item value corresponding to the item name in association with the item name.

7. The image processing apparatus according to claim 4, wherein when storing an item name in the extraction item storage section, the extraction item proposal section stores a character string feature used to retrieve a candidate character string for an item value corresponding to the item name in association with the item name.

8. A portable computer readable non-volatile recording medium storing a program causing a computer to execute a process for extracting a value of an information item from an input document image, the process comprising:
   generating a document image by optically reading a paper document;
   executing optical character recognition on the document image and obtaining a character recognition result;
   obtaining a character string semantically corresponding to an item name of an extraction target by natural language analysis;
   extracting, from the character recognition result, a first character string as a character string relevant to the item name of the extraction target;
   retrieving information of a relative position of a second character string, the relative position of the second character string being a location in the document image in the vicinity of the extracted first character string corresponding to the item name in one or more of left, right, upper, lower, lower left, lower right, upper left, and upper right directions from the extracted first character string;
   extracting the second character string of an item value corresponding to the item name based upon the retrieved relative position of the second character string, the second character string being different from the first character string; and
   associating the extracted second character string of the item value to the item name to generate extraction information.

9. An image processing method comprising:
   generating a document image by optically reading a paper document;
   executing optical character recognition on the document image and obtaining a character recognition result;
   obtaining a character string semantically corresponding to an item name of an extraction target by natural language analysis;
   extracting, from the character recognition result, a first character string as a character string relevant to the item name of the extraction target;
   retrieving information of a relative position of a second character string, the relative position of the second character string being a location in the document image in the vicinity of the extracted first character string corresponding to the item name in one or more of left, right, upper, lower, lower left, lower right, upper left, and upper right directions from the extracted first character string;
   extracting the second character string of an item value corresponding to the item name based upon the retrieved relative position of the second character string, the second character string being different from the first character string; and
   associating the extracted second character string of the item value to the item name to generate extraction information.

* * * * *